US005768977A

United States Patent [19]
Parris et al.

[11] Patent Number: 5,768,977
[45] Date of Patent: Jun. 23, 1998

[54] SMOKER ADAPTER FOR BARBECUE GRILLS

[75] Inventors: Bob G. Parris, St. Peters; Cynthia Marie Dabbelt, St. Charles, both of Mo.

[73] Assignee: Jackes-Evans Manufacturing Company, St. Louis, Mo.

[21] Appl. No.: 901,411

[22] Filed: Jul. 28, 1997

[51] Int. Cl.⁶ ............................ A47J 37/00; A47J 37/04; A47J 37/06; A47J 37/07

[52] U.S. Cl. ............................ 99/340; 99/417; 99/482; 126/9 R; 126/25 R

[58] Field of Search ............................ 99/339, 340, 400, 99/401, 444–446, 352–355, 448–450, 481, 473–476, 482, 410–418; 126/25 R, 25 A, 9 R, 9 B, 30

[56] References Cited

U.S. PATENT DOCUMENTS

| | | |
|---|---|---|
| 3,776,127 | 12/1973 | Muse .......................................... 99/482 |
| 4,020,322 | 4/1977 | Muse ...................................... 99/448 X |
| 4,094,295 | 6/1978 | Boswell et al. ........................ 126/25 R |
| 4,300,444 | 11/1981 | Muse .......................................... 99/448 |
| 4,467,709 | 8/1984 | Anstedt .................................. 99/446 X |
| 4,495,860 | 1/1985 | Hitch et al. ................................. 99/340 |
| 4,512,249 | 4/1985 | Mentzel ...................................... 99/352 |
| 4,554,864 | 11/1985 | Smith et al. ........................... 99/417 X |
| 4,957,039 | 9/1990 | Reyes ......................................... 99/449 |
| 4,962,696 | 10/1990 | Gillis ..................................... 99/482 X |
| 5,359,923 | 11/1994 | Boswell ................................. 99/444 X |
| 5,531,154 | 7/1996 | Perez, III ............................. 99/450 X |
| 5,564,330 | 10/1996 | Nowicke, Sr. ............................ 99/340 |

*Primary Examiner*—Timothy F. Simone
*Attorney, Agent, or Firm*—Dennison, Meserole, Pollack & Scheiner

[57] ABSTRACT

A tubular extension member converts a covered barbecue having a base and a removable cover to a smoker type barbecue. The extension member provides a larger cooking chamber and supports a water supply pan for the addition of water vapour to the cooking atmosphere. The extension member includes an access door in the side thereof for adding fuel to the barbecue base or for adding water to the water supply pan.

8 Claims, 5 Drawing Sheets

5,768,977

SMOKER ADAPTER FOR BARBECUE GRILLS

FIELD OF THE INVENTION

The present invention relates to adapters for barbecues for converting the Barbecue to a smoker-type barbecue.

BACKGROUND OF THE INVENTION

Smoker-type barbecues have gained popularity and in contrast to a charcoal or gas barbecue grills, smoker barbecues, typically require long cooking times, a larger cooking chamber, and a moist cooking atmosphere.

There are a number of dedicated smoker kettle barbecues which provide this environment and typically have a fuel support for charcoal or wood adjacent the lower part of the barbecue, a water support pan above the fuel support and a grill supporting the food to be cooked above the water pan.

An example of a known arrangement for converting a kettle barbecue grill to a smoker-type barbecue is found in Norwicke U.S. Pat. No. 5,564,330. This structure requires extensive user assembly and does not allow for convenient addition of combustible material and does not provide a moist cooking atmosphere.

It would be desirable to convert an existing barbecue to a smoker-type barbecue to avoid having two separate dedicated barbecues.

It can be appreciated that there are many existing kettle-type barbecues with one of the most common type of kettle-type barbecues being a Webber Kettle Barbecue. The adapter of the present invention is particularly suitable for converting a kettle barbecue to a smoker kettle barbecue.

SUMMARY OF THE INVENTION

An adapter for converting a barbecue, having a base and a cover, to a smoker barbecue comprises a tubular extension member having a lower edge which sears with the base and a top edge configured to support the cover such that the tubular extension member substantially increases the height and cooking volume of the barbecue defined by the space enclosed by the base, tubular extension member and the cover. The tubular extension member below the top edge includes inwardly directed support means supporting a cooking grill at the periphery thereof. The tubular extension member below the cooking grill includes a water supply pan. An access door is provided in a wall of the cylindrical extension member and the access door is positioned adjacent the water supply pan to allow the addition of water to the pan and to allow fuel to be added to the barbecue during use.

The tubular extension member converts the barbecue to a smoker-type barbecue having a moist, larger volume, environment suitable for the longer cooking times of the smoker-type unit. The tubular extension member increases the cooking chamber and the access door provides convenience and safety allowing a user to add fuel to the converted barbecue and to add water to the water pan from time to time without removing the cover or the adapter. The door is sized to allow water to be added to the pan and the support structure for the water pan is preferably spaced away from the door to allow good access to the fuel support in the lower part of the barbecue.

According to an aspect of the invention, the support means for the cooking grill include clips which slide on and engage the top edge of the tubular extension member and these clips have inwardly directed flanges interior to the tubular extension for supporting the cooking grill.

According to a further aspect of the invention, the water pan is centrally supported within the tubular extension member.

According to yet a further aspect of the invention, the central pan is spaced below the cooking grill at least two inches and preferably about two and one quarter inches.

According to yet a further aspect of the invention, the access door is secured by a hinge to the tubular extension member.

According to yet a further aspect of the invention, the adapter has a lower edge which is inwardly rolled upon itself to provide a rounded bottom edge.

According to yet a further aspect of the invention, the tubular extension member includes two opposed handles for placing of, or removing of, the tubular extension member from the barbecue base.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
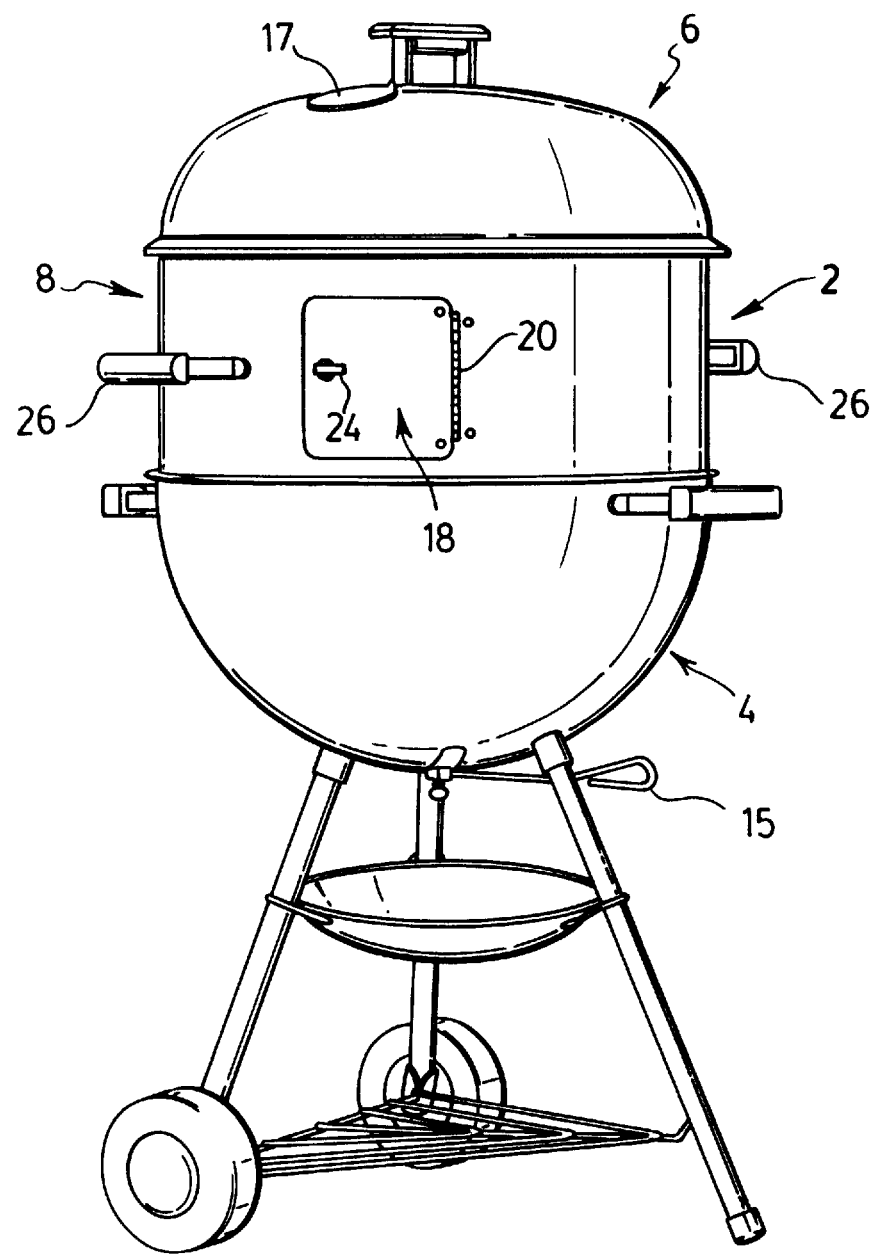
FIG. 1 is a perspective view of the adapter secured in a kettle barbecue.
Figure 2:
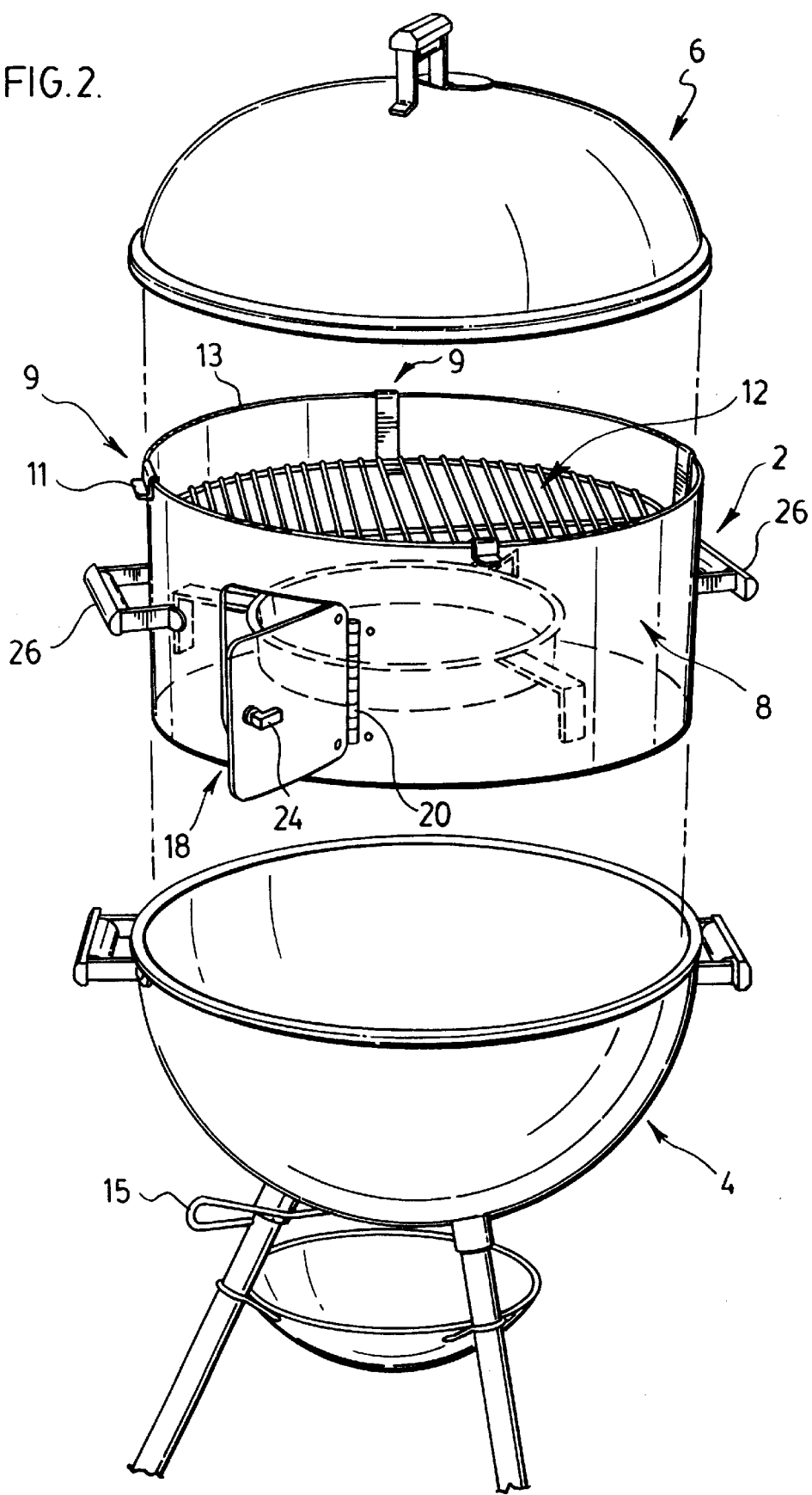
FIG. 2 is an exploded perspective view of the adapter and barbecue.
Figure 3:
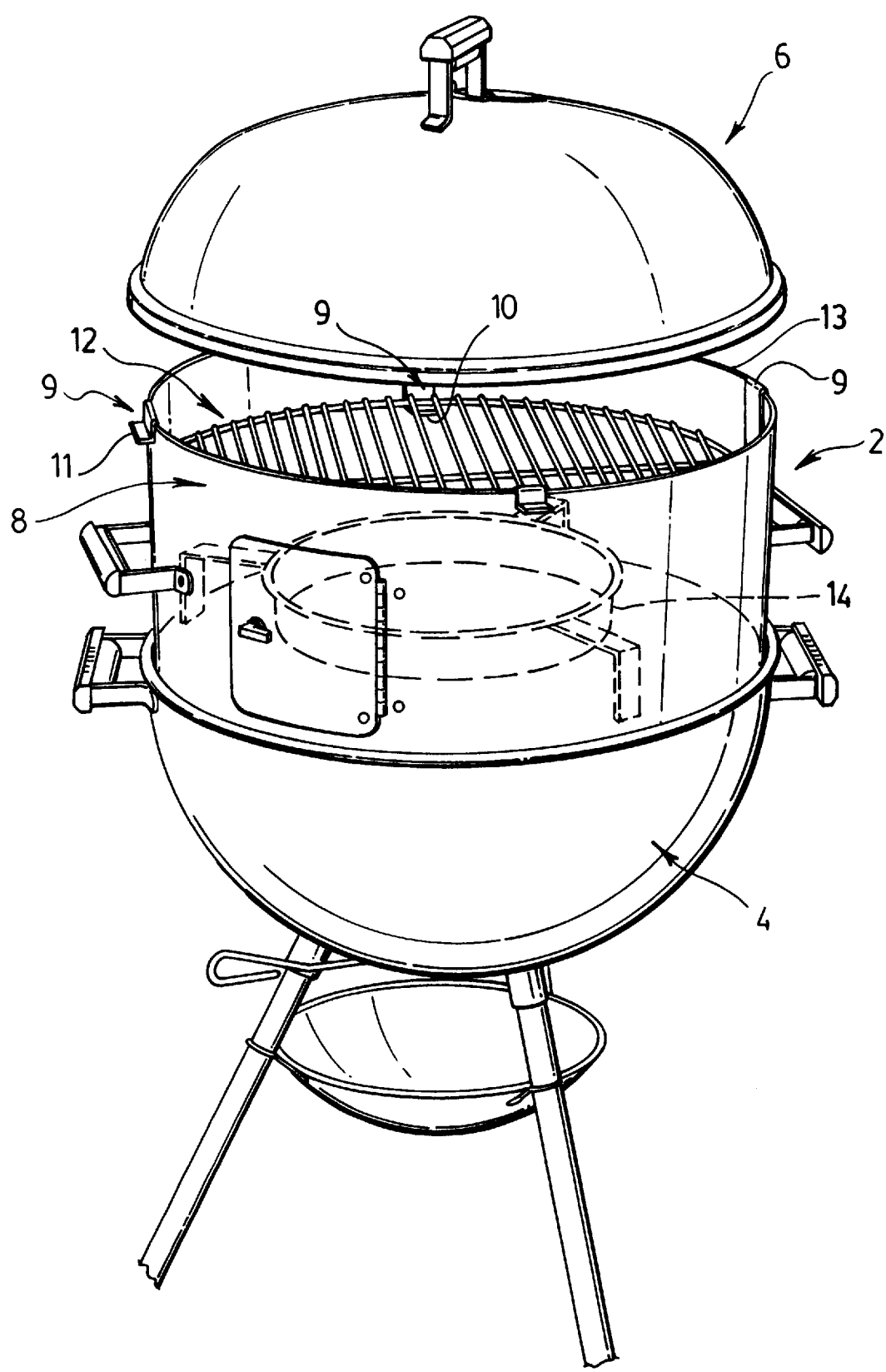
FIG. 3 is a perspective view of the adapter seated in the kettle base.
Figure 4:
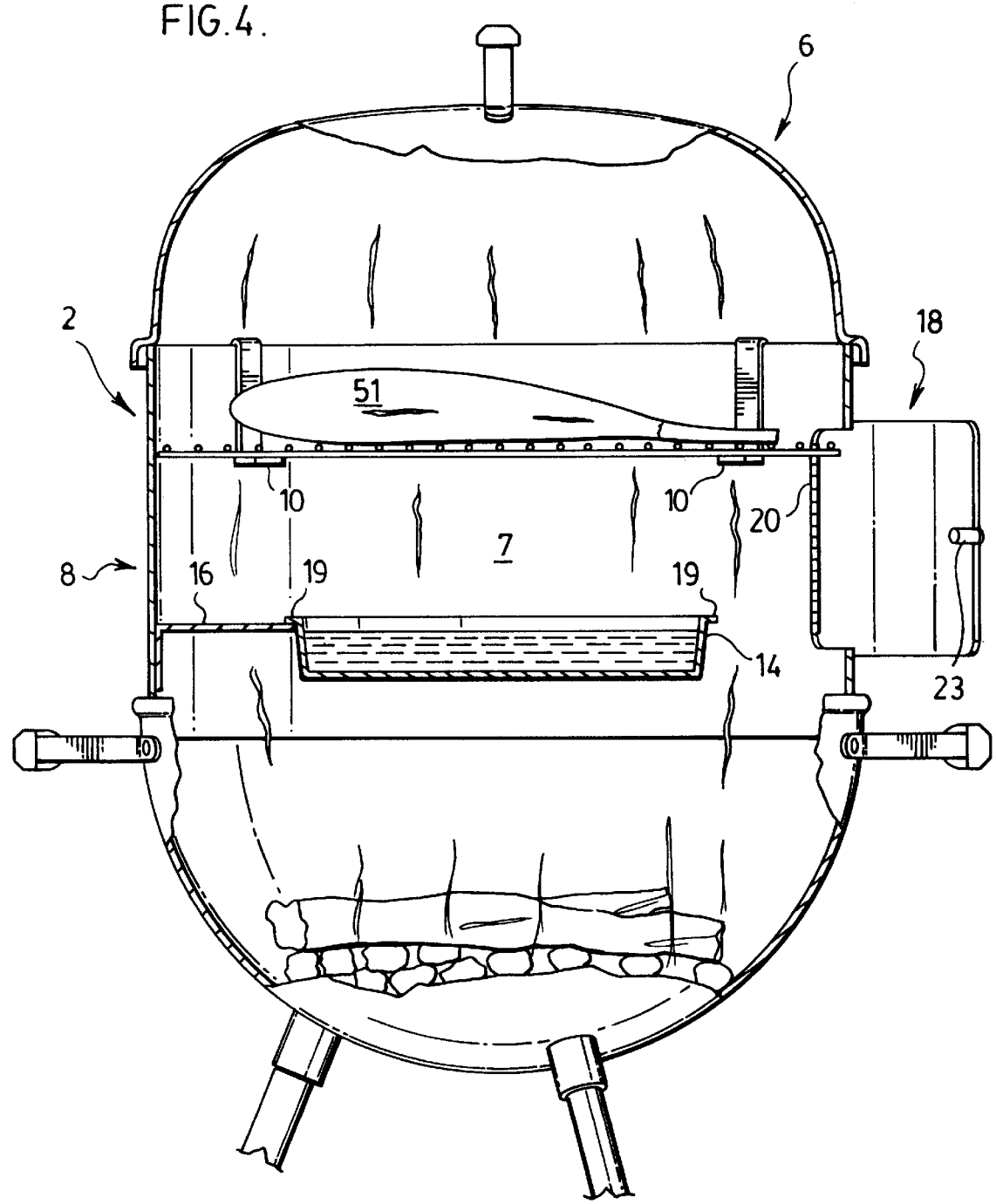
FIG. 4 is a partial cut away view of the adapter in the kettle barbecue.
Figure 5:
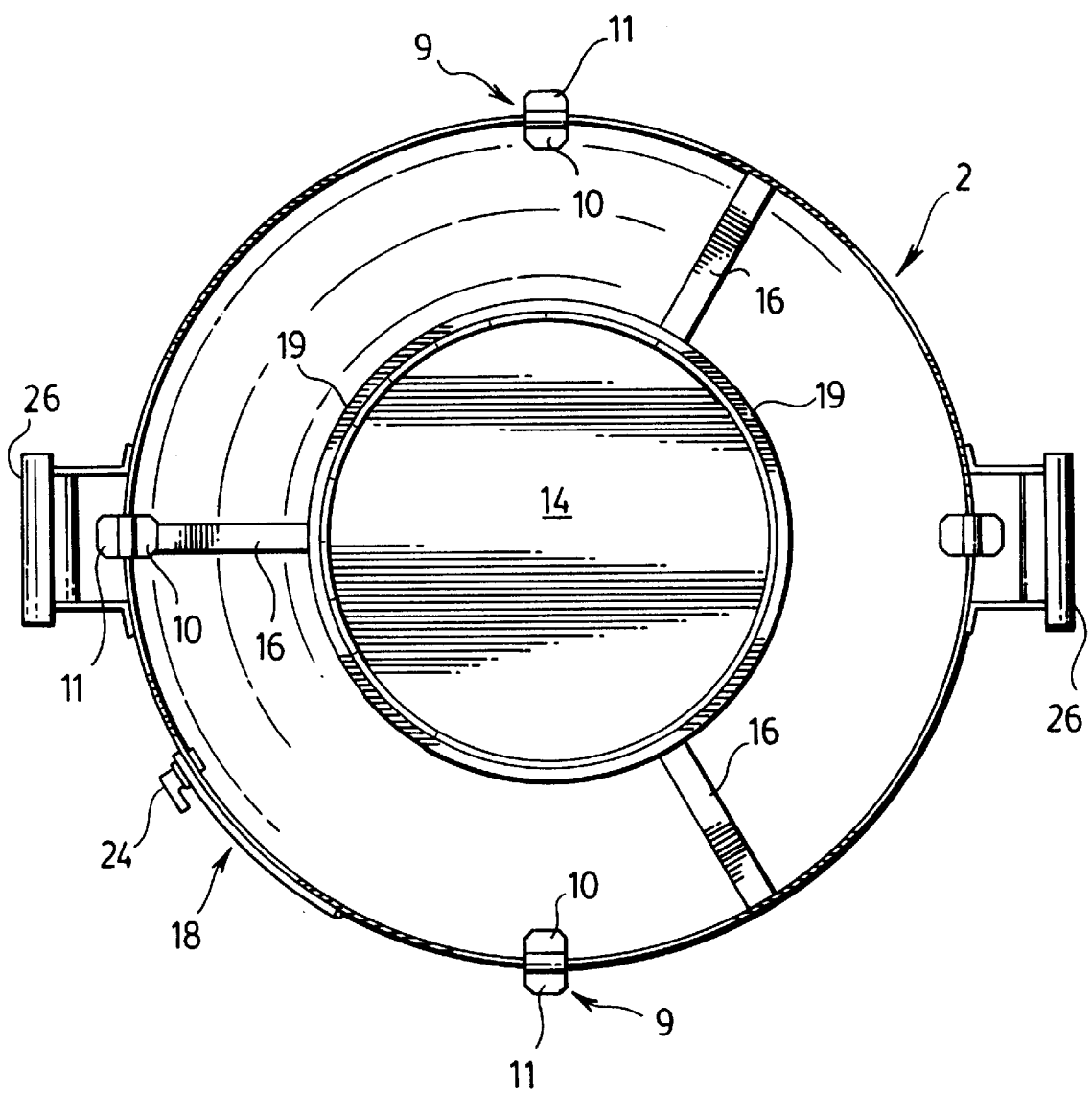
FIG. 5 is a top view of the adapter.

The adapter 2, as shown in FIGS. 1, 2 and 3, is used to space the barbecue base 4 and the barbecue cover 6 and increase the cooking chamber. The adapter provides a large cooking chamber 7, additional space for a water supply pan 14 to add moisture to the cooking atmosphere and allows the accumulation of smoke in the upper part of the barbecue. The cooking fuel is supported in base 4 in the conventional manner and the damper controls 15 in the base and vent 17 in the cover can be used to vary the combustion rate. The tubular extension member 8 is adapted to be supported in the barbecue base 4 and provides an overlap relationship such that smoke is retained within the cooking chamber. The upper edge of the tubular extension member 8 which in this case is cylindrical, is adapted to cooperate with the barbecue cover 6 and again provide sufficient overlap to retain smoke within the cooking chamber. In order to support the barbecue cover 6, the cylindrical extension member 8 has been provided with a series of clips 9 distributed at various points along the edge of the tubular member. Each clip 9 has a "U"-shaped body portion for snuggling engaging the upper edge of the tubular member and it includes an outwardly directed flange 11 for engaging the bottom edge of the cover 6 and an inwardly directed flange 10 for supporting the cooking grill 12. The inwardly directed flanges 10 are located several inches below the upper edge 13 to increase the volume of the cooking chamber above the cooking grill 12. Other arrangements are possible. For example, the upper edge 13 could have a top flange for supporting the barbecue cover.

A water supply pan 14 is positioned centrally within the tubular extension member 8 and below the cooking grill 12, at least two inches and preferably two and one quarter inches. The water pan is supported on inwardly directed supports 16 attached to the walls of the tubular extension member 8. Any suitable securing mechanism can be used, such as bolts, slots or rivets, for example. The supports 16 engage and support the outwardly turned lip 19 of the water pan 14. The supports 16 if desired can extend beneath the water pan, providing a locating recess for the pan and bottom support of the pan. These supports 16 can be joined beneath the pan 14, if desired.

An access door 18 is provided in the side of the tubular extension member 8 and provides convenient access to the water supply pan 14 and also allows the user to add charcoal, hardwood or other material located in the barbecue base. Basically the additional combustible material for smoke generation and/or heat can be dropped to the support grill through the door 18. The door includes a hinge 20 to allow convenient movement of the door and a spring latch 23 can be provided on the opposite side. A thermal insulating handle 24, preferably of wood, is provided for opening and closing of the door.

The tubular extension member 18 includes handles 26 which are normally used to install the extension member on the barbecue base 4. During use of the converted barbecue the cooking grill 12 is accessed by removal of the barbecue cover 6 and the tubular extension member 8 stays on the barbecue base 4. Additional water can be added to the supply pan 14 through the access door 18 and the fuel can be added to the barbecue base or through the access door. The food 51 is easily turned or basted when the top 6 is removed.

The access door 18 is preferably located approximately two and three eights of an inch below the upper edge 13 of the tubular extension member 8 and it is also located about three and one-half inches above the lower edge of the cylindrical member. In this way, the tubular extension remains continuous along the upper and lower edges to provide better support and the access door merely covers a port in the wall of the tubular member. The access door is located between the cooking grill 12 and the fuel support grill. The access door is positioned in a gap between the supports for the water pan to allow good access to the fuel support grill in the barbecue base 4. The access door is preferably the size of about five and one half inches by six inches and has a periphery matching the periphery of the tubular extension member. The tubular extension member is typically formed of metal sheet material and as such, will have a joining seam.

This arrangement, allows conversion of a kettle-type barbecue to a smoker-type barbecue where the atmosphere within the smoking chamber is moist. The adapter is also designed to support the food grill 12 below the upper edge of the adapter for improved safety of the converted barbecue and to increase the size of the cooking chamber above the cooking grill.

The adapter of the present invention provides an economical alternative to the purchase of a smoker-type barbecue as it allows an existing barbecue and in particular, a kettle-type barbecue to be converted for this additional purpose.

The water supply pan 14 for a two and one half inch kettle barbecue is twelve and one quarter inches in diameter, one to two inches in depth and has a clear spacing from the sides of the cylindrical member of approximately four to five inches. This provides a substantial gap through which fuel can be loaded into the barbecue. The water pan moderates the cooking temperature and provides a central block below the food being cooked. For smoker-type applications, the actual cooking time can be in excess of four hours and fuel typically is added, from time to time.

The adapter is sized to fit particular size barbecues. One popular kettle size barbecue is about twenty-one inches in diameter. The water pan diameter is preferably varied with the size of the kettle barbecue and in this case, is about twelve inches in diameter. This leaves a clear gap between the adapter and the periphery of the water pan of about five inches.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property of privilege is claimed are defined as follows:

1. An adapter for converting a barbecue having a base and a cover to a smoker barbecue comprising a tubular extension member having a lower edge which seats with said base and a top edge configured to support said cover such that said tubular extension member substantially increases the height and cooking volume of said barbecue, said tubular extension member below said top edge including inwardly directed support means supporting a cooking grill at the periphery thereof, said tubular extension member below said cooking grill including a water supply pan, said tubular extension member further including an access door in a wall thereof positioned adjacent said water supply pan to allow water to be added to said pan and to allow fuel to be added to the base of said barbecue during use of said barbecue.

2. An adapter as claimed in claim 1 wherein said inwardly directed support means include clips which slide on and engages said top edge and have inwardly directed flanges interior to said tubular extension member for supporting said cooking grill.

3. An adapter as claimed in claim 2 wherein said water pan is centered within said tubular extension member.

4. An adapter as claimed in claim 3 wherein said central pan is spaced below said cooking grill at least two inches.

5. An adapter as claimed in claim 1 wherein said access door is secured by a hinge to said tubular extension member.

6. An adapter as claimed in claim 1 wherein said lower edge is inwardly rolled upon itself.

7. An adapter as claimed in claim 2 wherein said access door is spaced below said upper edge at least two inches and spaced above said lower edge at least three inches.

8. An adapter as claimed in claim 2 wherein said access door is spaced below said upper edge two and three eighths of an inch and spaced above said lower edge three and one half inches.

* * * * *